United States Patent
Thomas

(10) Patent No.: US 10,624,479 B2
(45) Date of Patent: Apr. 21, 2020

(54) SIMULTANEOUS BENCH-STABILIZED RETENTION OF BOTH POLE-MOUNTED ITEMS AND ALSO OF SMALL PERSONAL ITEMS

(71) Applicant: Leslie Glynn Thomas, Combine, TX (US)

(72) Inventor: Leslie Glynn Thomas, Combine, TX (US)

( * ) Notice: Subject to any disclaimer, the term of this patent is extended or adjusted under 35 U.S.C. 154(b) by 0 days.

(21) Appl. No.: 15/716,248

(22) Filed: Sep. 26, 2017

(65) Prior Publication Data
US 2018/0263394 A1    Sep. 20, 2018

Related U.S. Application Data

(60) Provisional application No. 62/400,431, filed on Sep. 27, 2016, provisional application No. 62/549,739, filed on Aug. 24, 2017.

(51) Int. Cl.

| | | |
|---|---|---|
| *A01K 97/10* | (2006.01) |
| *A47G 23/02* | (2006.01) |
| *A47C 7/68* | (2006.01) |
| *E04H 12/22* | (2006.01) |
| *A47C 7/62* | (2006.01) |
| *A47C 11/00* | (2006.01) |
| *A47C 7/66* | (2006.01) |
| *F16M 13/02* | (2006.01) |

(52) U.S. Cl.
CPC .......... *A47G 23/0225* (2013.01); *A47C 7/622* (2018.08); *A47C 7/664* (2018.08); *A47C 7/68* (2013.01); *A47C 11/00* (2013.01); *E04H 12/22* (2013.01); *E04H 12/2269* (2013.01); *F16M 13/022* (2013.01)

(58) Field of Classification Search
CPC ...................................................... A01K 97/10
USPC ....... 248/689, 514, 515, 534, 535, 538, 539, 248/536, 540, 311.2, 314, 316.1, 907; 135/98, 116
See application file for complete search history.

(56) References Cited

U.S. PATENT DOCUMENTS

| | | | | |
|---|---|---|---|---|
| 140,747 | A * | 7/1873 | Walker | B25B 5/101 |
| | | | | 269/215 |
| 4,071,219 | A * | 1/1978 | Seager | A01K 97/10 |
| | | | | 248/534 |
| 4,887,786 | A * | 12/1989 | Stokes | A45B 11/00 |
| | | | | 248/512 |
| 5,566,916 | A * | 10/1996 | Bailey | F16L 3/1226 |
| | | | | 24/277 |

(Continued)

*Primary Examiner* — Terrell L McKinnon
*Assistant Examiner* — Michael McDuffie
(74) *Attorney, Agent, or Firm* — Groover & Associates PLLC; Robert O. Groover, III; Gwendolyn G. Corcoran

(57) ABSTRACT

The present invention provides an accessory retention device for using on bench type seating or tables made from planks. The device holds not only a pole, but also holders for drinks or other personal items. The device is adjustable to fit a variety of stadium seating, using the device adjustable mount system, which allows the mounting pieces that clamp on to the stadium seating to expand and contract for a secure fit. The device also allows the user to select what type of pole mounted item to insert into the support device, as the device is capable of adjusting to accommodate different types and sizes of poles, such as umbrella, flags, rods, etc. The device is compact, portable, and easy to carry with a built in handle.

18 Claims, 11 Drawing Sheets

(56) References Cited

U.S. PATENT DOCUMENTS

| | | | | |
|---|---|---|---|---|
| 5,992,804 A * | 11/1999 | Johnson | | B63B 29/06 114/363 |
| 6,550,737 B1 * | 4/2003 | Sai | | F16M 13/02 211/69.1 |
| 6,672,559 B1 * | 1/2004 | Boldia | | A01K 97/10 248/534 |
| 6,948,877 B1 * | 9/2005 | Lo | | F16B 2/065 248/229.12 |
| 7,175,140 B2 * | 2/2007 | Johnson | | E04D 13/12 248/124.2 |
| 7,201,442 B1 * | 4/2007 | Decosta, Jr. | | A47C 7/66 135/16 |
| 8,146,879 B2 * | 4/2012 | Liao | | A45B 11/00 248/514 |
| 8,308,123 B1 * | 11/2012 | Accordino | | A45B 11/00 248/156 |
| 8,393,343 B2 * | 3/2013 | VanVonderen | | E04F 11/181 135/16 |
| 8,800,196 B2 * | 8/2014 | Baumann | | A01K 97/10 248/534 |
| 9,521,835 B1 * | 12/2016 | Gersch | | A01K 97/10 |
| 9,851,050 B1 * | 12/2017 | Cano | | B62B 5/0013 |
| 2002/0036008 A1 * | 3/2002 | Hickam | | A47B 37/04 135/98 |
| 2006/0231723 A1 * | 10/2006 | Fayerman | | A01K 97/10 248/540 |
| 2008/0029137 A1 * | 2/2008 | McInville | | E04H 12/2269 135/16 |
| 2008/0042027 A1 * | 2/2008 | LaScala | | B63B 17/02 248/229.15 |
| 2008/0295383 A1 * | 12/2008 | Wakefield | | A01K 97/10 43/21.2 |
| 2010/0083557 A1 * | 4/2010 | Stanton | | A01K 91/08 43/21.2 |

* cited by examiner

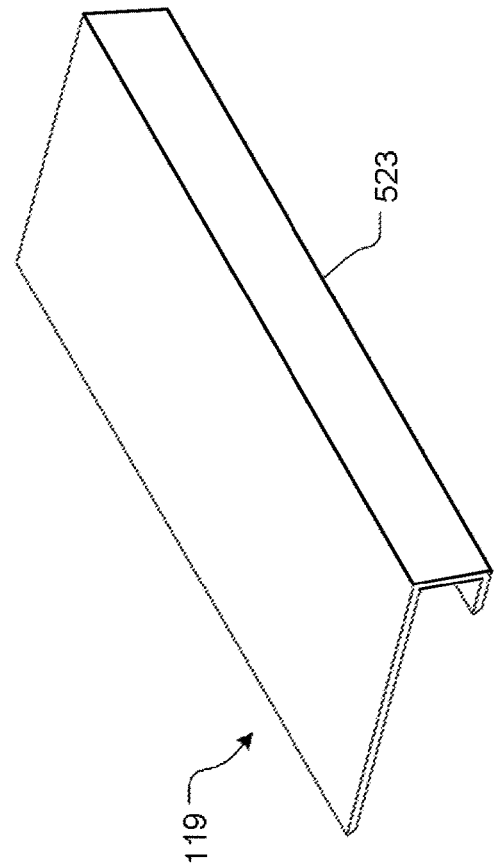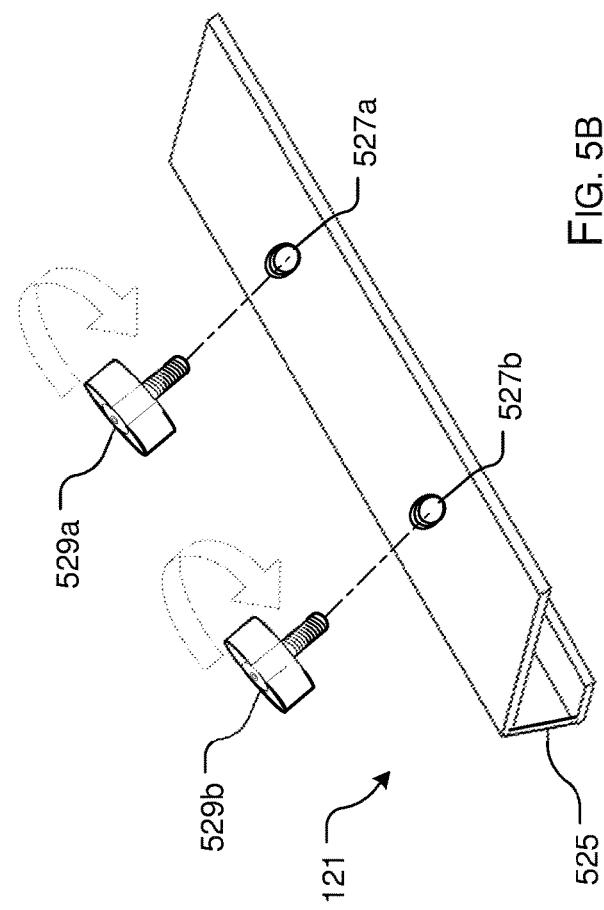

SIMULTANEOUS BENCH-STABILIZED RETENTION OF BOTH POLE-MOUNTED ITEMS AND ALSO OF SMALL PERSONAL ITEMS

CROSS-REFERENCE TO RELATED APPLICATIONS

Priority is claimed from US provisional applications U.S. 62/400,431 and 62/549,739. Each of these applications is hereby incorporated by reference in its entirety for all purposes.

BACKGROUND

The present application relates to accessories for seated recreational activities, and more specifically to systems and methods for bench-stabilized retention of both umbrellas (or the like) and small personal items.

Note that the points discussed below may reflect the hindsight gained from the disclosed inventions, and are not necessarily admitted to be prior art.

Conventional stadium umbrella stands shade the person attending an outdoor event and may provide the person a place to set down a drink. A typical conventional umbrella stand has a base that rests on the ground, which may have three to four legs for stability, an adjustable umbrella holder, and a table or cup holder to hold drinks.

The present application discloses a single device (and related methods and assemblies) with a rigid base which clamps onto a sturdy bench seat, and uses the structural rigidity of the seat (with a seated user present) to stabilize both an umbrella (or the like) and at least one (and preferably more) holders for small items. Preferably a clamp mechanism holds the base onto enough of the fore-aft extent of the bench seat to suppress fore-aft tilting, and preferably the width of the rigid base is enough to suppress left-right tilting. Preferably lipped clamping pieces are used, so that the rigidity of the connection between the rigid base and the bench seat is not merely dependent on friction. Indeed, the fastener for the clamp mechanism preferably does not itself apply any clamping force; this helps to achieve reliable attachment, since the user will not be tempted to compensate for bad mounting or bad closure by using extra clamping force. Optionally, since adjustment while clamped will not be necessary, the mating surfaces of the clamping location can be roughened.

There are a number of innovative teachings disclosed in the present application. While these innovative teachings all combine synergistically, it should be noted that different innovations, and different subcombinations of these innovations, are all believed to be useful and nonobvious. No disclosed inventions, nor combinations thereof, are disclaimed nor relinquished in any way. The present application teaches, among other innovations, a combination pole mounted item and personal item holders for use with plank style supports on to which the combination pole mounted item and personal item holder's adjustable mounting assembly is capable of attachment.

The present application teaches, among other innovations, a method in which a combination pole mounted item and personal item holders is mounted onto a bench seat (e.g. one constructed of spaced planks) by adjustable spaced lipped clamping pieces.

The present application teaches, among other innovations, an assembled structure in which a combination pole mounted item and personal item holders is mounted onto a bench seat (e.g. one constructed of spaced planks) by a rigid base having a lipped clamping piece over one edge of the bench seat, while another lipped clamping piece, connected to the rigid base by an adjustable extension, holds a second edge of the bench seat.

Most preferably a sturdy pole socket is mounted onto the rigid base, so that poles of different lengths and/or thicknesses can be held.

In addition to the basic concepts listed above, many alternatives and modifications are also possible, as shown by the examples and discussion below.

Space is limited in a stadium seating environment, so the disclosed structure has been optimized to use the least possible space. This is itself an advantage, and also provides the further advantages of portability and robustness.

Since a pole-mounted umbrella can be large (e.g. a 10-foot beach umbrella), the wind force on the umbrella can be significant even under light winds (e.g. 5-10 knots). One advantage of the disclosed structure is that the significant forces exerted by light winds can be withstood by this compact structure, especially if a user's weight is present to help stabilize the bench seat. (Of course, moderate or fresh breezes may exert too much force, but users can be expected to pull in umbrellas under such conditions.)

BRIEF DESCRIPTION OF THE DRAWINGS

The disclosed inventions will be described with reference to the accompanying drawings, which show important sample embodiments and which are incorporated in the specification hereof by reference, wherein:

FIGS. 5A and 5B are perspective views of mounting pieces for the combination pole mounted item and personal item holders system in accordance with a preferred embodiment of the present application;

DETAILED DESCRIPTION OF SAMPLE EMBODIMENTS

Figure 1:
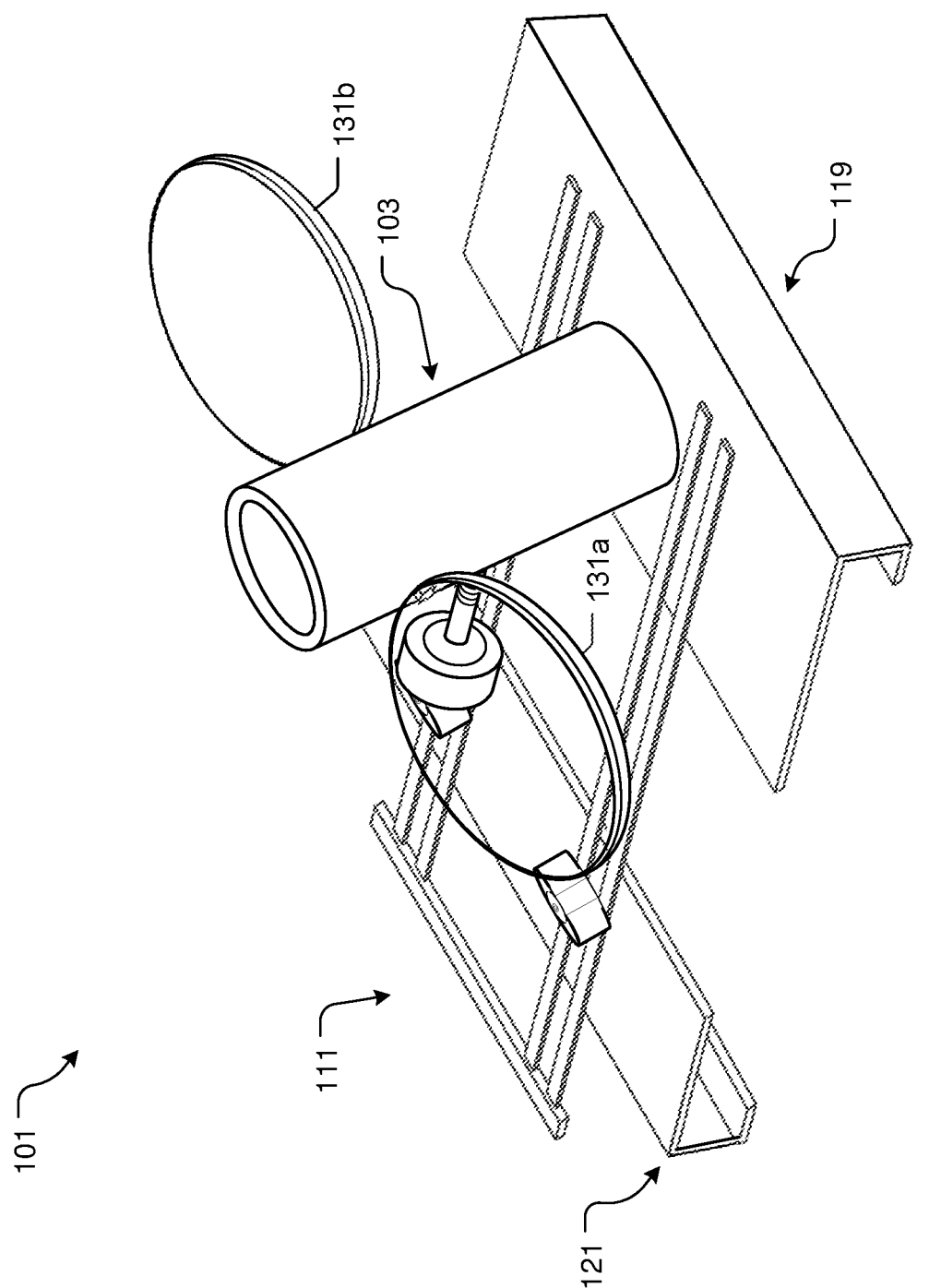
FIGS. 1 and 2 are perspective views of a combination pole mounted item and personal item holder system in accordance with a preferred embodiment of the present application.

The numerous innovative teachings of the present application will be described with particular reference to presently preferred embodiments (by way of example, and not of limitation). The present application describes several inventions, and none of the statements below should be taken as limiting the claims generally.

The present application discloses new approaches to managing accessories for seated recreational activities, and more specifically to systems and methods for bench-stabilized retention of both umbrellas (or the like) and small personal items. The various illustrated embodiments secure an umbrella (or flag or other pole mounted item), while also providing multiple small item holders. These preferred embodiments are useful in public outdoor places, especially those that have plank style benches and/or table tops. By allowing the user to adjust the width of the combination pole mounted item and personal item holder to accommodate different depth or multiple plank benches or table tops.

The present application is designed to adjust to fit the most common park benches with seat depths, ranging from 10" to 30" and a plank thickness of approximately 1.5", which provides the unit at a minimum a dimensional footprint of an approximate one square foot to provide counter balance to external forces exerted upon the pole, mounted item secured in the unit. The unit is secured to the plank surface horizontal with the aid of angled clamp lips on the front and back mounting brackets instead using the direct clamping force resulting from torqueing a nut and bolt going directly to the plank. In an alternative vertical plank alternative embodiment, the unit may also be secured to vertical plank surfaces in a similar manner as described earlier.

The present application discloses the use of supporting various sizes and types of pole mounted items on a pole assembly, such as a 10' beach umbrella, a standard 6' patio umbrella, where the upper portion of the umbrella is used without the support base, a flag, or any other item that is mounted on a pole. The pole-mounted items are secured with the use of at least one adjustable pole clamp, which allows the user to accommodate various widths of poles and securely clamp them into the unit. In the alternative vertical plank embodiment, the user is able to reorient the direction of the pole assembly from being perpendicular to the unit to being at an acute angle to the unit as it is moved upward and then secure the pole assembly in place allowing the user to select what angle to have their pole mounted item.

The unit also contains areas to hold drinking vessels and personal items, which are located on the side of the holder assembly in the preferred embodiment. There are also additional areas that can be utilized for holding personal items on the unit. It should be noted that personal item holder might consist of a simple bracket structure, a basket structure, or a removable basket/container that attaches to a simple bracket structure.

Figure 2:
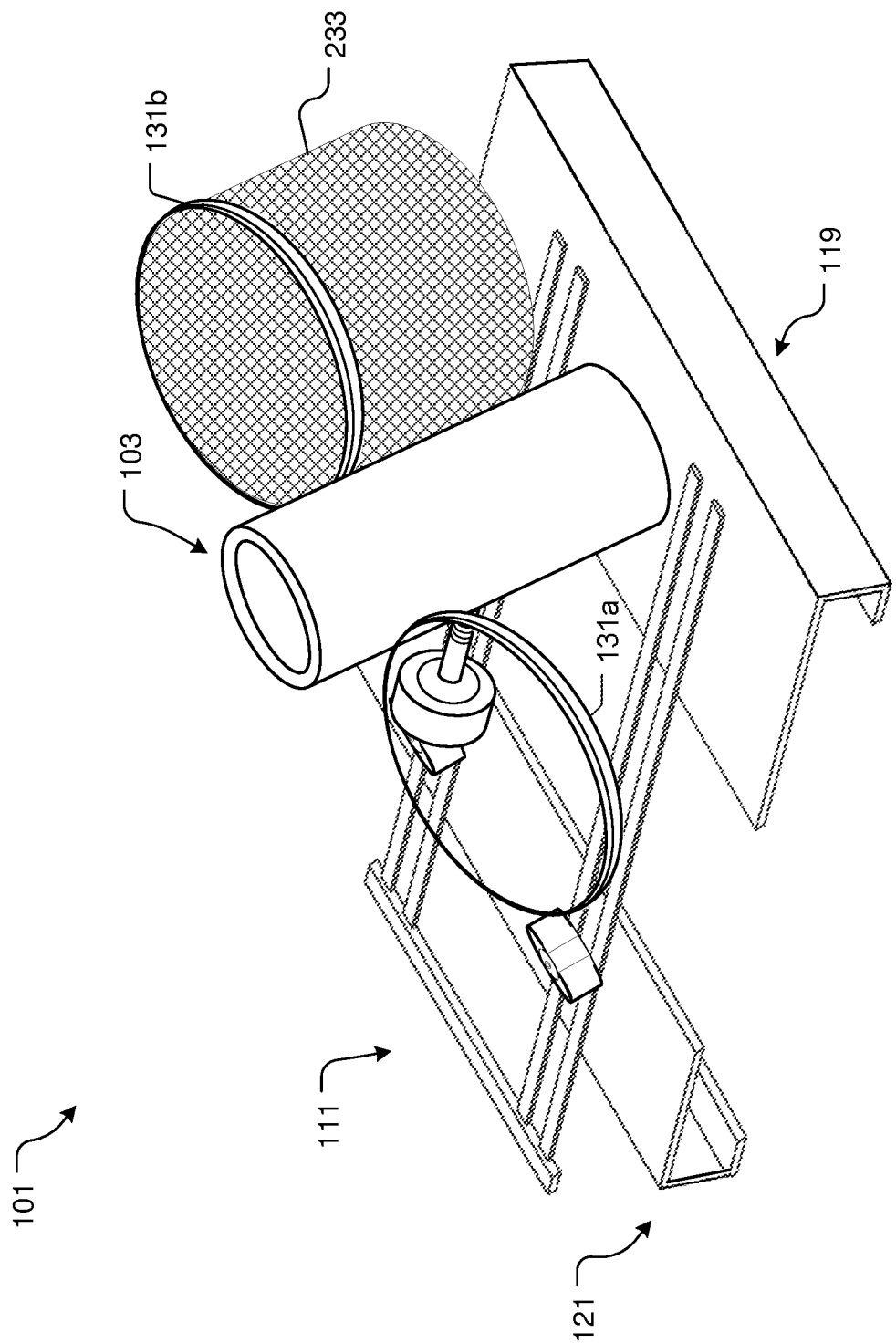

FIGS. 1 and 2 show perspective views of a unit 101 for simultaneous bench-stabilized retention of both pole-mounted items and also of small personal items, in accordance with a preferred embodiment of the present application.

Unit 101 comprises a pole socket 103 affixed to a rigid base plate 119. In this example of an implementation, both are made of steel, and are welded together. Also attached to the rigid base plate 119 are slider bars 111, also (in this example) made of steel. Note that the rigid base plate 119 is shaped along one side, in this example, to form a lip which can grasp one edge of a bench seat.

A secondary mounting unit 121 is attached to the slider bars 111 by (in this example) clamping screws. At least two small item holders 131a and 131b are attached to the pole socket. The personal item holders can optionally have respective baskets 233 attached.

Figure 3:
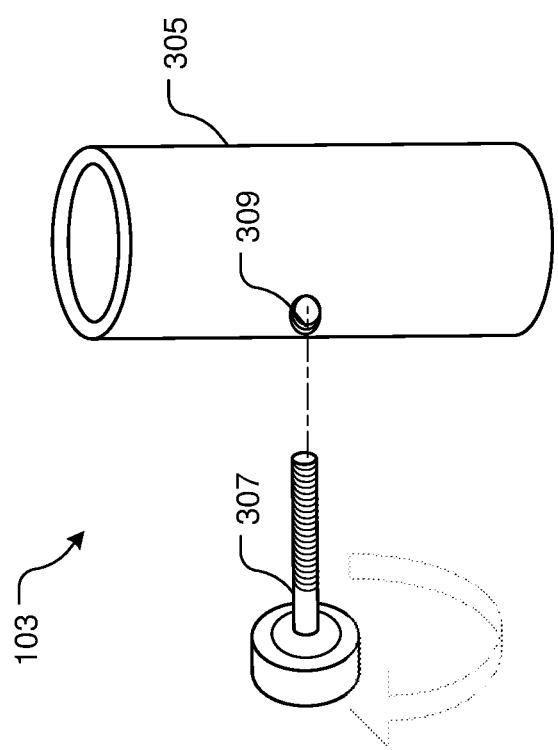
FIG. 3 is a perspective view of a pole holder assembly for the combination pole mounted item and personal item holders system in accordance with a preferred embodiment of the present application.

FIG. 3 shows a perspective view the pole socket 103 for system 101. In this example, the pole socket 103 includes a screw 307 threaded into a tapped hole 309 in a base cylinder 305. In alternative embodiments, additional screws etc. can be added.

Figure 4:
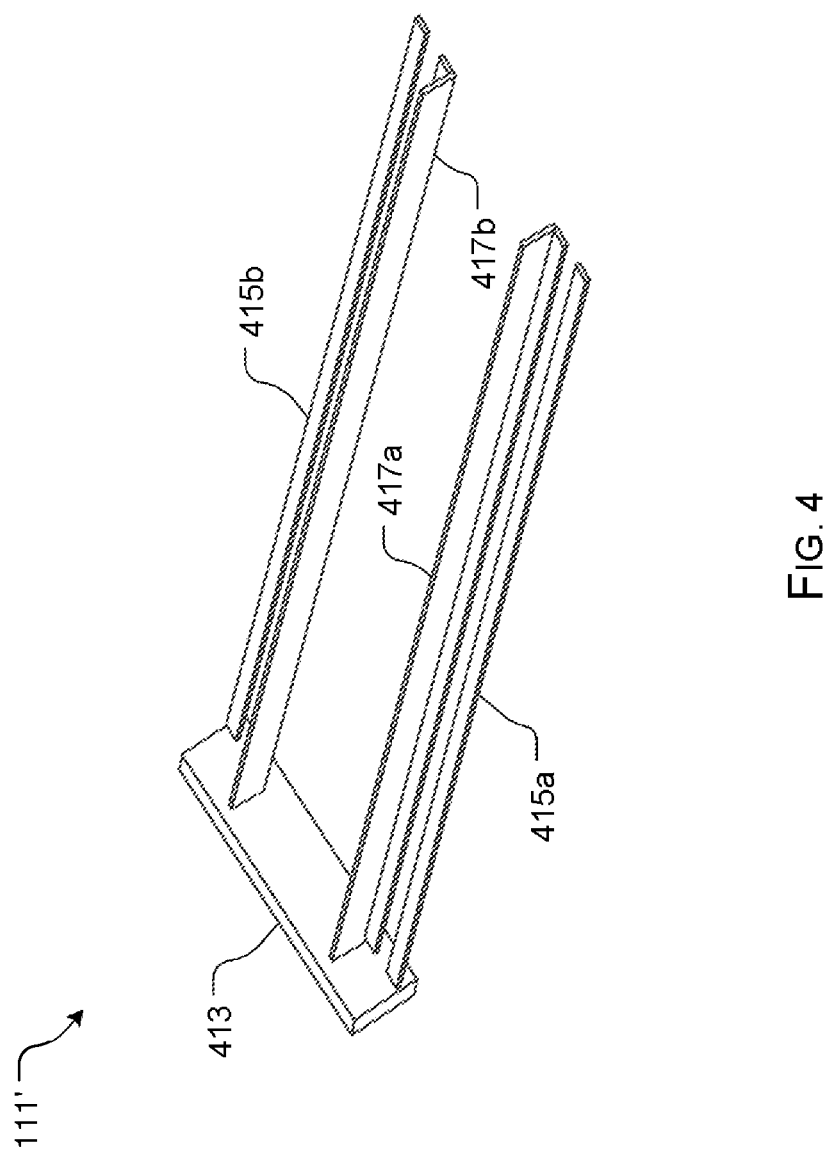
FIG. 4 is a perspective view of an adjustable mount assembly for the combination pole mounted item and personal item holders system in accordance with a preferred embodiment of the present application.

FIG. 4 shows improved sliding bars 111'. These differ from the sliding bars 111 of FIG. 2 in that an L-shaped cross section is used for the inner bars 417a and 417b. An endpiece 413 stabilizes the free ends of the sliding bars; note that endpiece 413 is somewhat larger than the endpiece of FIG. 2.

In this example, the width between the outer rails 415a, 415b and their respective inner rails 417a, 417b allow a clamping screw mechanism to enter a clamp access point. The adjustable mount assembly 111 allows the secondary mounting unit 121 (as seen in FIG. 1) to expand and contract the system 101 to fit securely on the plank(s).

FIG. 5A shows a detail view of the rigid base plate 119. The front mounting lip 523, formed in this base plate, preferably is dimensioned to hold a 1.5" plank thickness (commonly used with benches and tables made from planks).

FIG. 5B shows the secondary mounting unit 121. Note that threaded holes are provided for clamping screws 529a and 529b, which will hold the relative positioning of the secondary mounting unit.

Figure 6A:
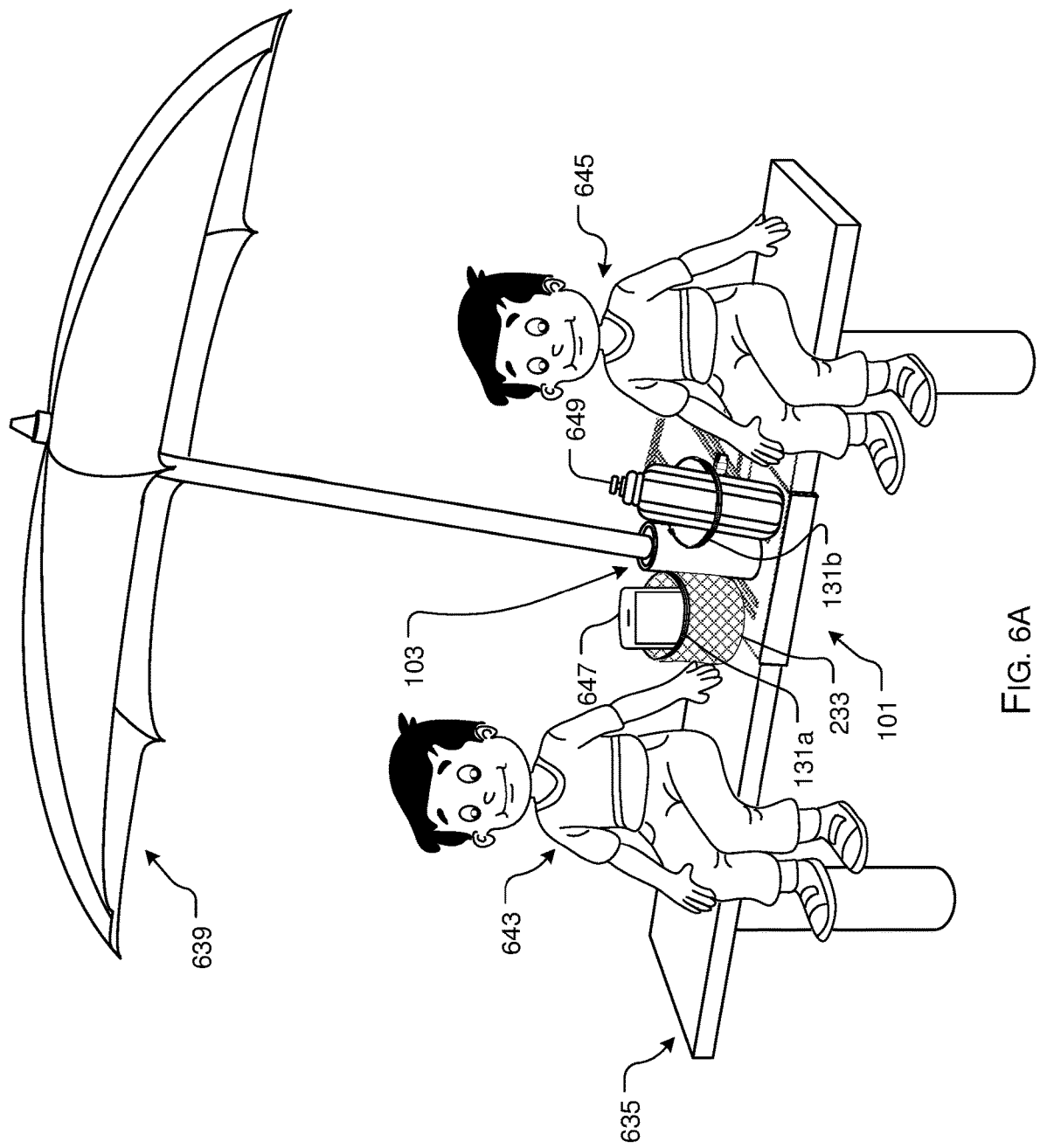
FIGS. 6A and 6B are perspective views of examples of the combination pole mounted item and personal item holders system mounted on plank style seating in accordance with a preferred embodiment of the present application.

FIG. 6A shows a perspective view of the system 101 mounted to a single plank bench 635. In this example of system 101 two people 643, 645 are enjoying a day out while one person 643 has placed a cell phone 647 into the first personal item holder 131a that has the basket 233 attached, while the other person 645 has a water bottle 649 in the second personal item holder 131b. The pole holder assembly 103 is being utilized to hold an umbrella 639.

Figure 6B:
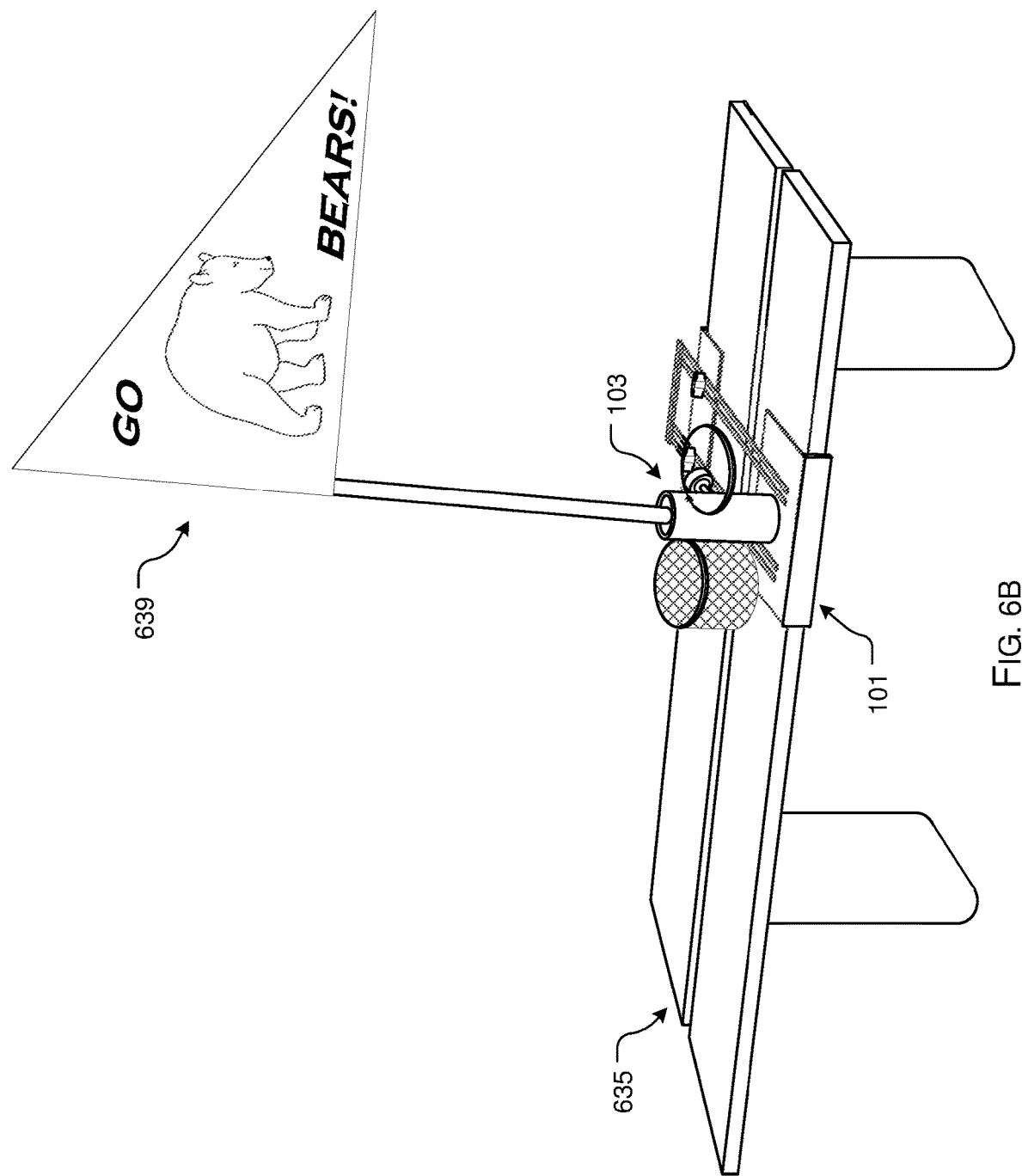

FIG. 6B shows a perspective view the system 101 mounted to a double plank bench 637. In this example of system 101 the pole holder assembly 103 is being utilized to hold a flag 641.

Figure 7:
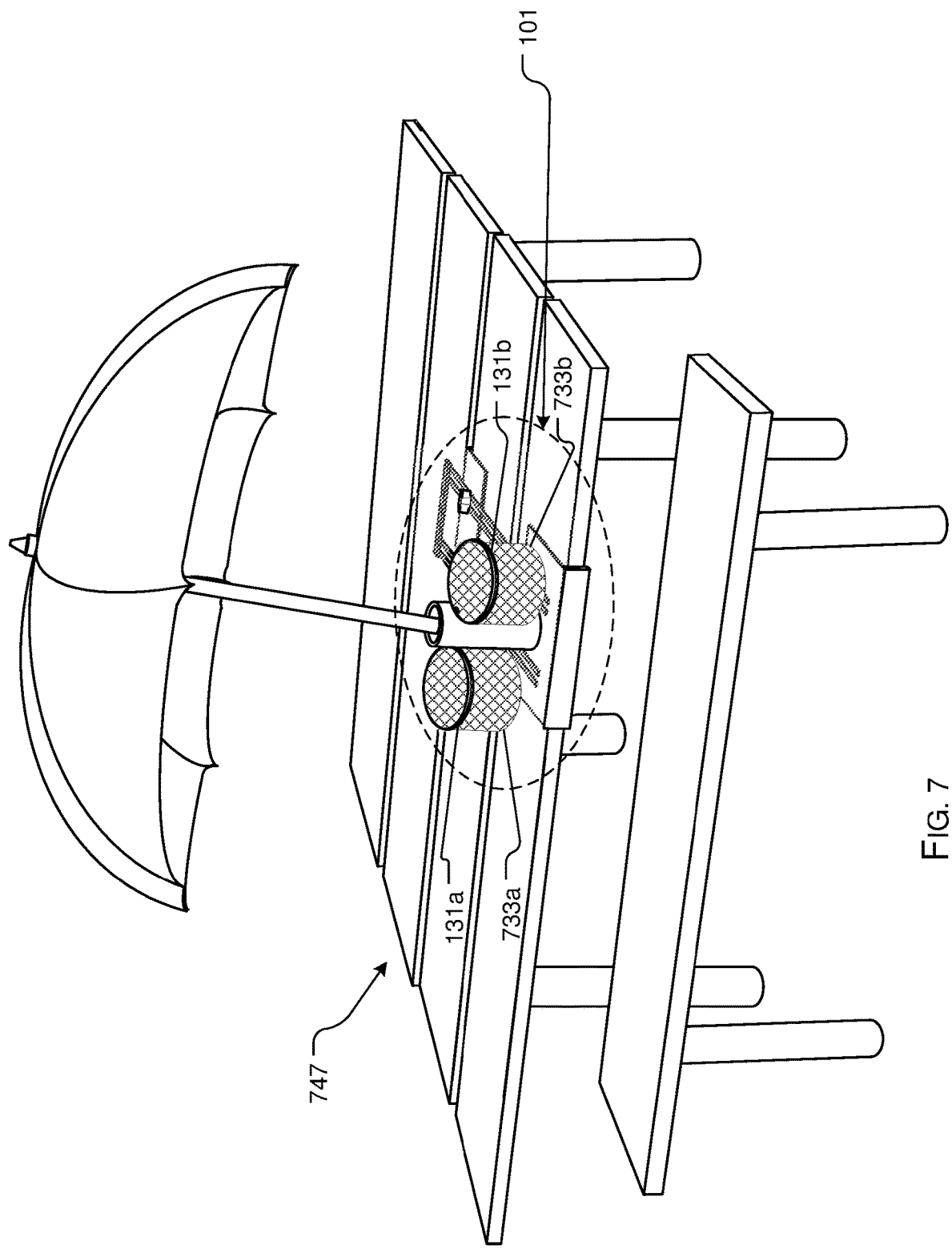
FIG. 7 is a perspective view of example of the combination pole mounted item and personal item holder system mounted on a plank style table in accordance with a preferred embodiment of the present application.

FIG. 7 shows a perspective view the system 101 mounted to a picnic table 747. In this example of system 101 both first personal item holders 131a, 131b have the baskets 733a, 733b attached.

Figure 8:
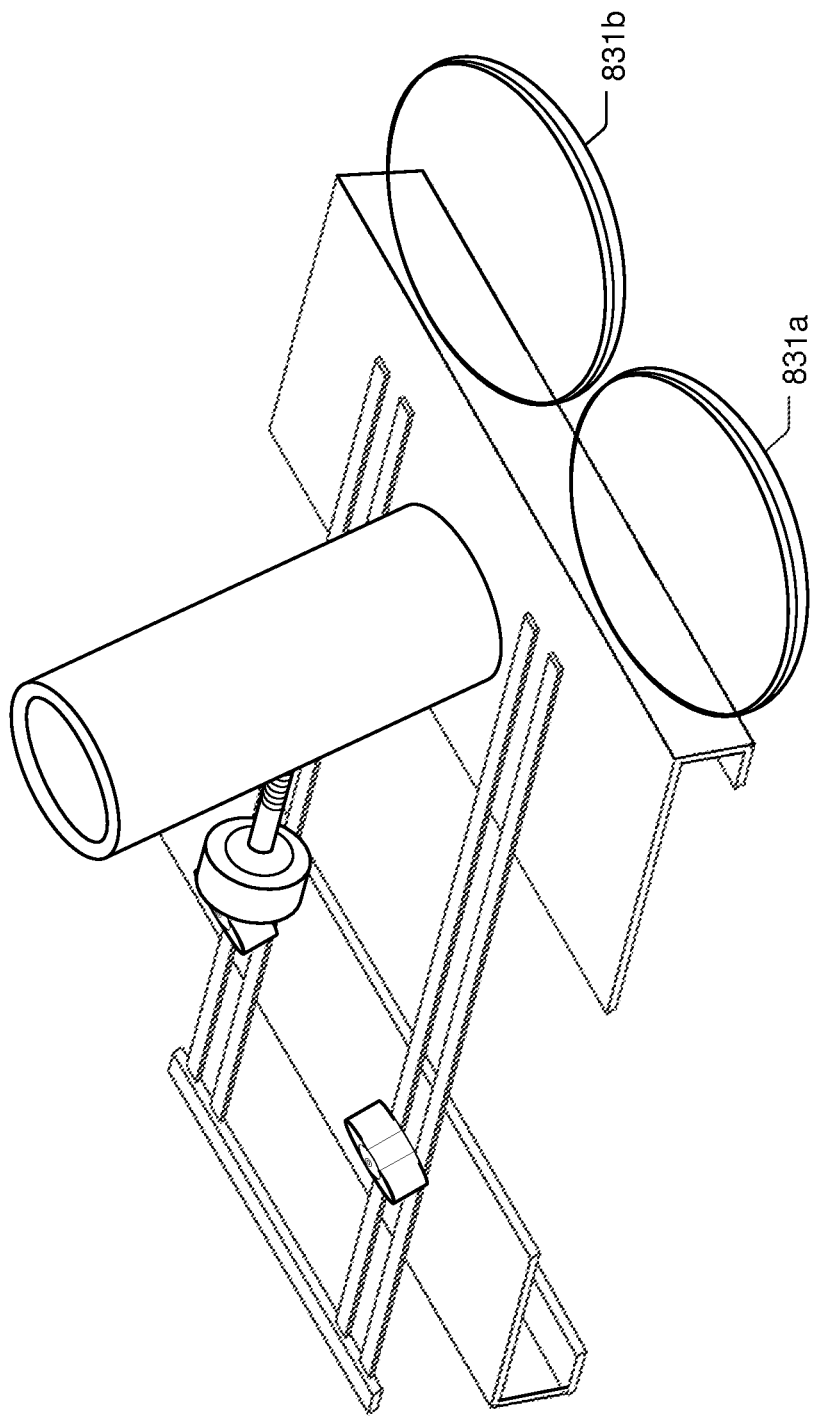
FIGS. 8 and 9 are perspective views of a combination pole mounted item and personal item holder system in accordance with an alternative embodiment of the present application.
Figure 9:
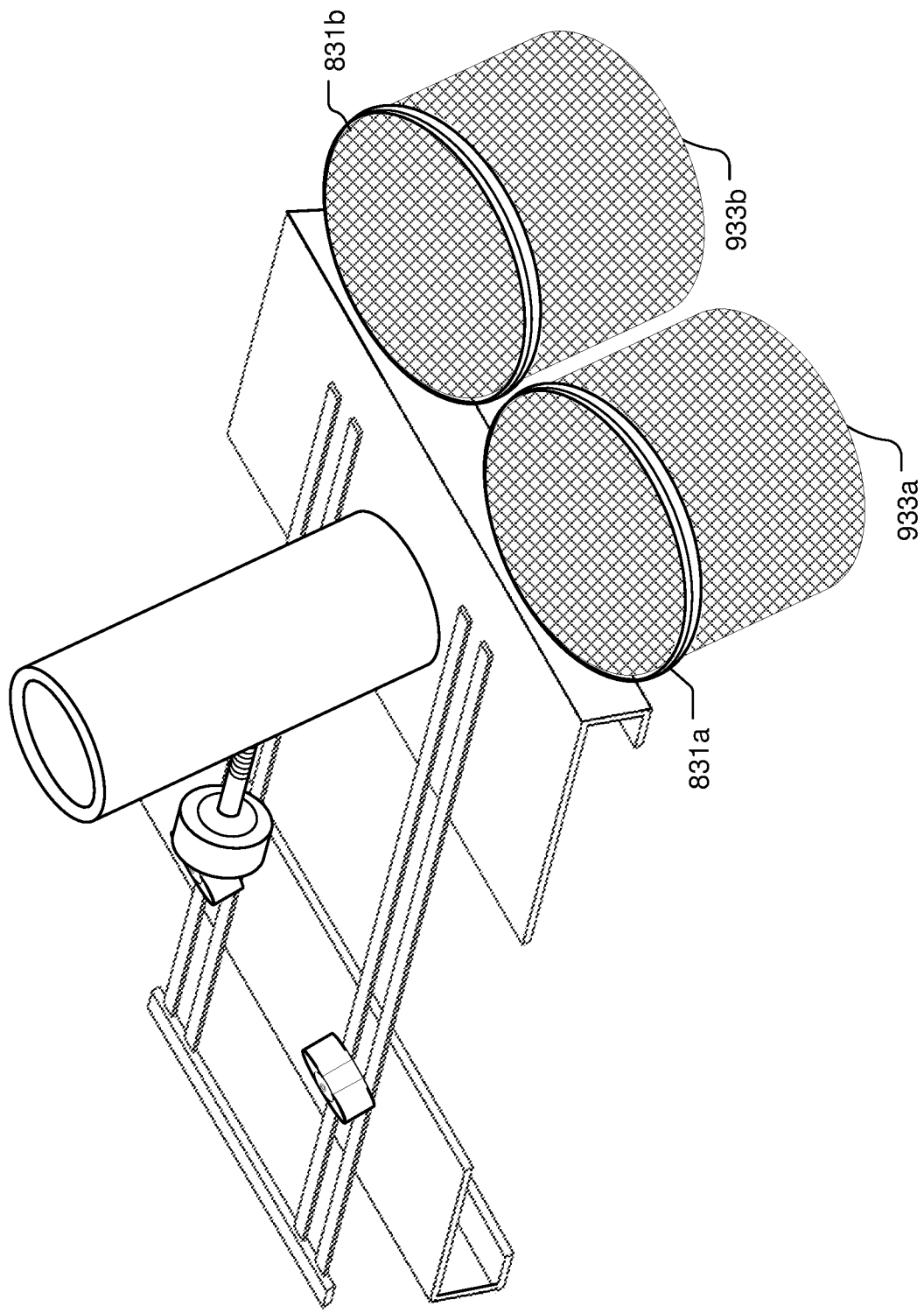

FIGS. 8 and 9 show perspective views of a combination pole mounted item and personal item holder system in accordance with an alternative embodiment of the present application. In this modification, small item holders 831a/b are attached to the rigid base itself, rather than to the pole socket connected to the front of the front mounting unit 819.

Optionally, the personal item holder can also have basket(s) attached.

Figure 10:
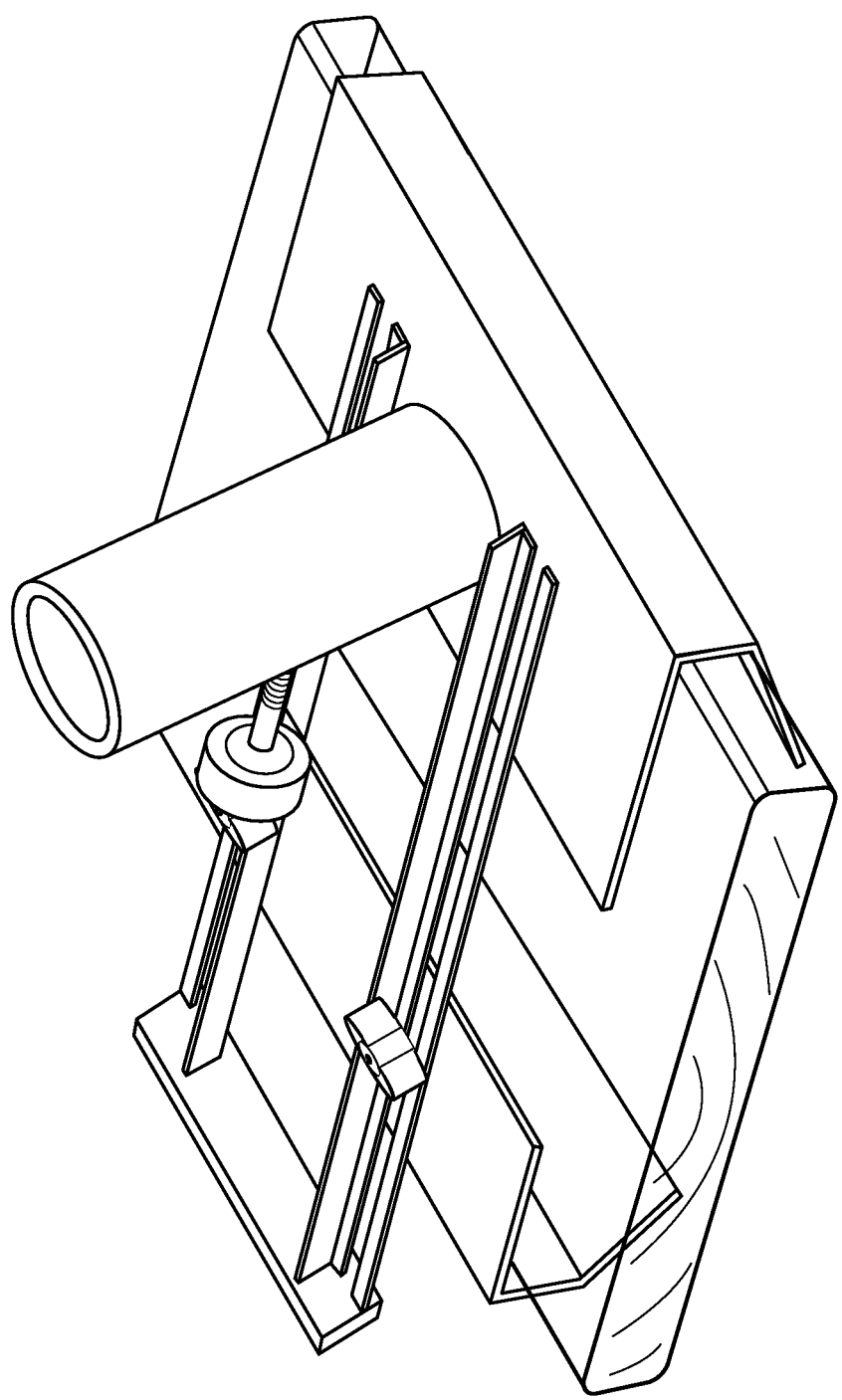
FIG. 10 shows another alternative embodiment, where the edge of the base is slanted on one or both sides.

FIG. 10 shows another alternative embodiment, where the edge of the base is slanted on one or both sides. This advantageously helps to achieve a secure grip on benches of different thicknesses.

Advantages

The disclosed innovations, in various embodiments, provide one or more of at least the following advantages (in addition to those noted above). However, not all of these advantages result from every one of the innovations disclosed, and this list of advantages does not limit the various claimed inventions.

Ability to be used on a variety of surfaces;
Ability to accommodate a variety of different type of pole mounted items;
Ability to hold multiple types of personal items;

Compact size of the complete assembly;
Portability; and/or
Robustness.

The forces exerted by light winds can be withstood by this compact structure, especially if a user's weight is present to help stabilize the bench seat.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications, and variations that fall within the spirit and broad scope of the appended claims.

In one class of alternative embodiments, the holders for the small items (or drinking vessels) are located on a separate free floating collar, which has secured to either the unit or the pole of the item which the uses has secured into the unit with the use of at least one adjustable collar screw. This free floating drinking vessels and personal item holder allows the user to choose what height to put their items at.

For another example, the pole socket can be positioned at different angles to the rigid base if desired. The pole socket can be normal to the rigid base, or can be tilted e.g. 5 degrees forward for compatibility of seats having their highest support point near the knee.

In another contemplated class of modifications, an adjustment mechanism can be included, to vary the pole's angle of forward or backward tilt. This is slightly less preferred, but can permit the pole to be repositioned to accommodate variation in sun position or wind direction, and can even (at high angles from normal)

None of the description in the present application should be read as implying that any particular element, step, or function is an essential element that must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is, among others (and, without exclusion, in addition to any other points, which are indicated herein as inventive and/or surprising and/or advantages):

1. A bench-stabilized accessory retention apparatus, comprising:
    a rigid base plate having a first clamping lip thereon;
    a pole socket attached to the rigid base plate;
    one or more small item holders which are directly or indirectly attached to the pole socket; and
    a secondary mounting piece which has a second clamping lip thereon, and which is attached to the rigid base plate by an adjustably slideable extension guide;
    wherein no mechanism forces the two clamping lips together;
    and whereby, when the extension guide is adjusted to bring the first and second clamping lips together to hold a seat portion therebetween, the rigid base plate is fixed in relation to the seat portion;
    wherein the adjustably slidable extension guide further comprises:
    a) at least two slider rails attached to the rigid base plate; and
    b) an endpiece, attached to the slider rails, which stabilizes the free ends of the slider rails;
    wherein the secondary mounting piece is attached to the slider rails by tightenable fasteners.

2. The bench-stabilized accessory retention apparatus of claim 1, further comprising an adjustment mechanism which allows the pole socket to accommodate various thicknesses of poles.

3. The bench-stabilized accessory retention apparatus of claim 1, wherein the item holders are cupholders.

4. The bench-stabilized accessory retention apparatus of claim 1, wherein the item holders are shaped to hold specific personal items.

5. The bench-stabilized accessory retention apparatus of claim 1, further comprising an umbrella clamped into the pole socket.

6. The bench-stabilized accessory retention apparatus of claim 1, further comprising a flag clamped into the pole socket.

7. The bench-stabilized accessory retention apparatus of claim 1, wherein the pole socket has an axis approximately normal to the rigid base plate.

8. The bench-stabilized accessory retention apparatus of claim 1, wherein the pole socket has an axis at least 10 degrees away from normal to the rigid base plate.

9. The bench-stabilized accessory retention apparatus of claim 1, wherein the rigid base plate extends for at least 8 inches laterally along the most extended dimension of the bench.

10. A bench-stabilized accessory retention apparatus, comprising:
    a rigid base plate having a first clamping lip thereon;
    a pole socket attached to the rigid base plate;
    one or more small item holders which are directly or indirectly attached to the pole socket and/or the rigid base plate;
    a secondary mounting piece which has a second clamping lip thereon, and which is slideably attached to an extension guide which is attached to the rigid base plate;
    wherein the first and second clamping lips are holding a bench seat therebetween wherein the adjustably slidable extension guide further comprises:
    a) at least two slider rails attached to the rigid base plate; and
    b) an endpiece, attached to the slider rails, which stabilizes the free ends of the slider rails;
    wherein the secondary mounting piece is attached to the slider rails by tightenable fasteners.

11. The bench-stabilized accessory retention apparatus of claim 10, further comprising an adjustment mechanism which allows the pole socket to accommodate various thicknesses of poles.

12. The bench-stabilized accessory retention apparatus of claim 10, wherein the item holders are cupholders.

13. The bench-stabilized accessory retention apparatus of claim 10, further comprising an umbrella clamped into the pole socket.

14. The bench-stabilized accessory retention apparatus of claim 10, further comprising a flag clamped into the pole socket.

15. The bench-stabilized accessory retention apparatus of claim 10, wherein the pole socket has an axis approximately normal to the rigid base plate.

16. The bench-stabilized accessory retention apparatus of claim 10, wherein the pole socket has an axis at least 10 degrees away from normal to the rigid base plate.

17. The bench-stabilized accessory retention apparatus of claim 1, wherein the first and second clamping lips each include an angled portion which, when the two clampling lips are brought closer together, additionally applies a secondary force which holds the base plate against the top surface of the piece being clamped.

18. The bench-stabilized accessory retention apparatus of claim 10, wherein the first and second clamping lips each include an angled portion which, when the two clampling lips are brought closer together, additionally applies a secondary force which holds the base plate against the top surface of the piece being clamped.

\* \* \* \* \*